Figure 1:
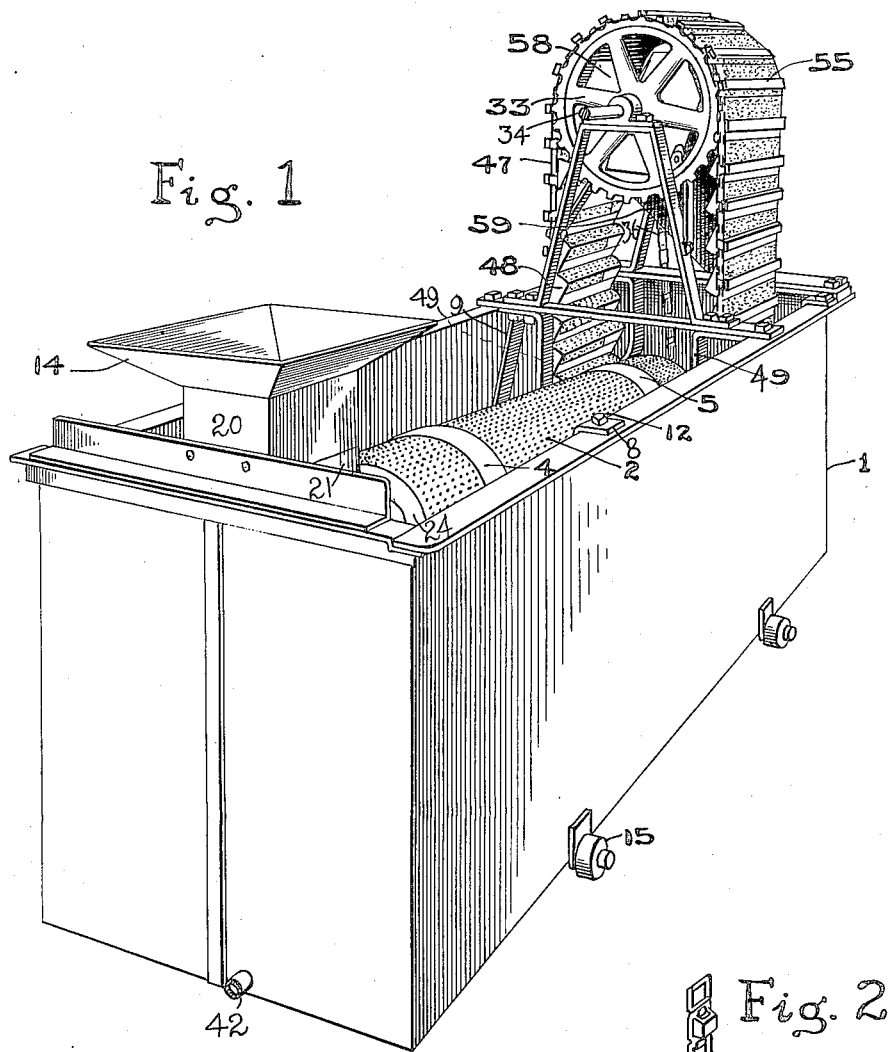

No. 890,148. PATENTED JUNE 9, 1908.
A. W. MACHLET.
HARDENING APPARATUS.
APPLICATION FILED APR. 3, 1907.

4 SHEETS—SHEET 1.

WITNESSES
Philip C. Osterman
Fritz W. Machlet

INVENTOR
Adolph W. Machlet
BY
B. C. Stickney
ATTORNEY

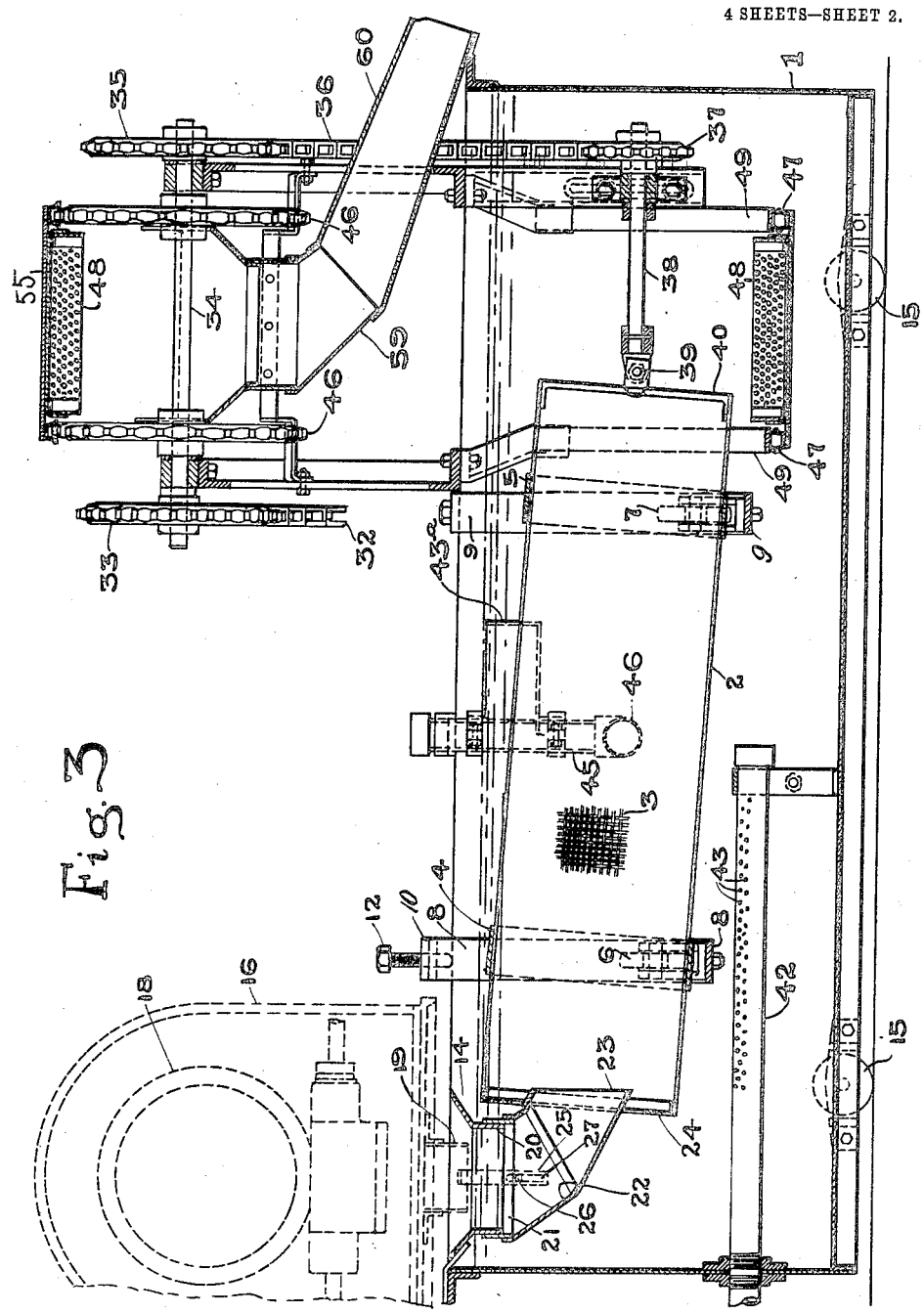

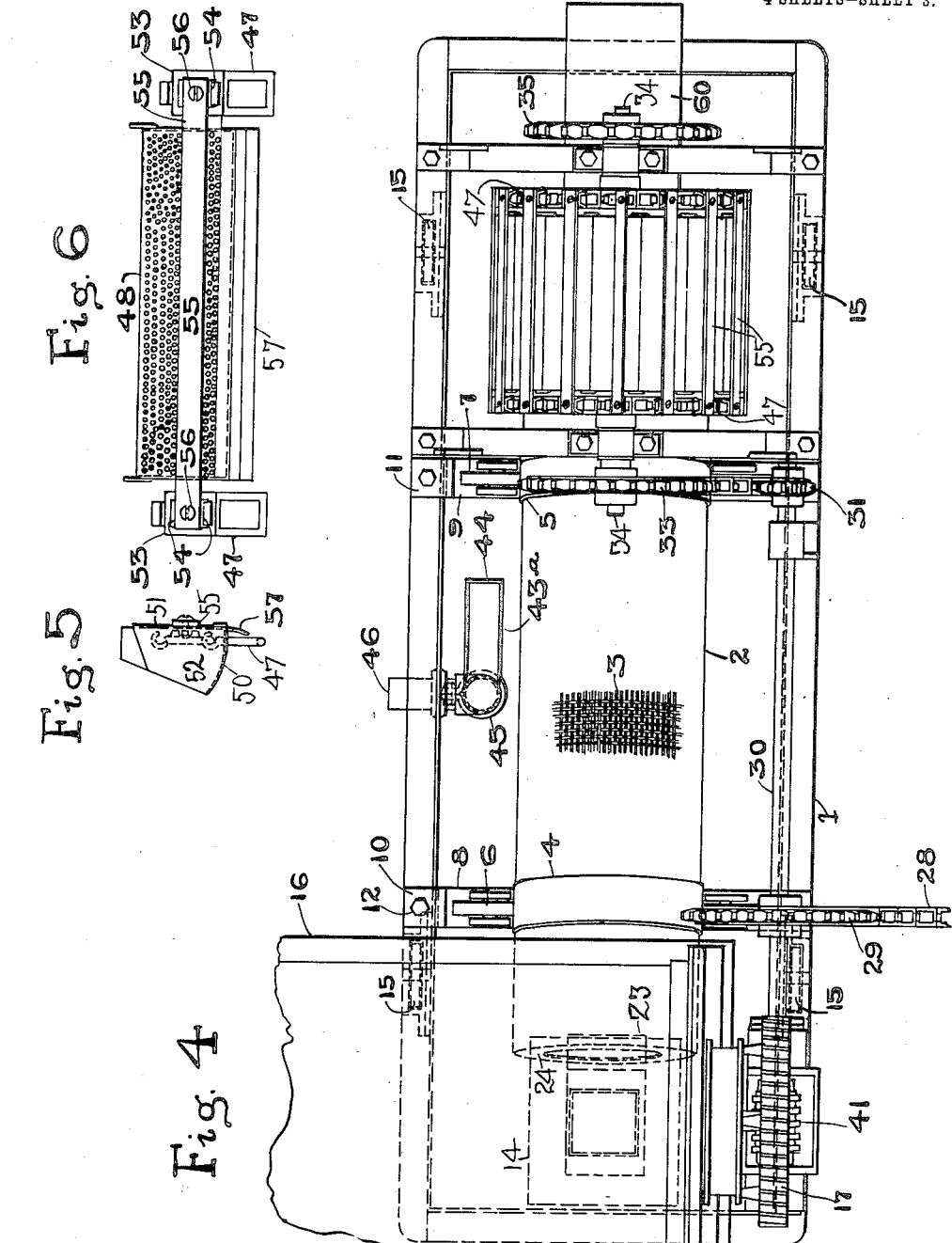

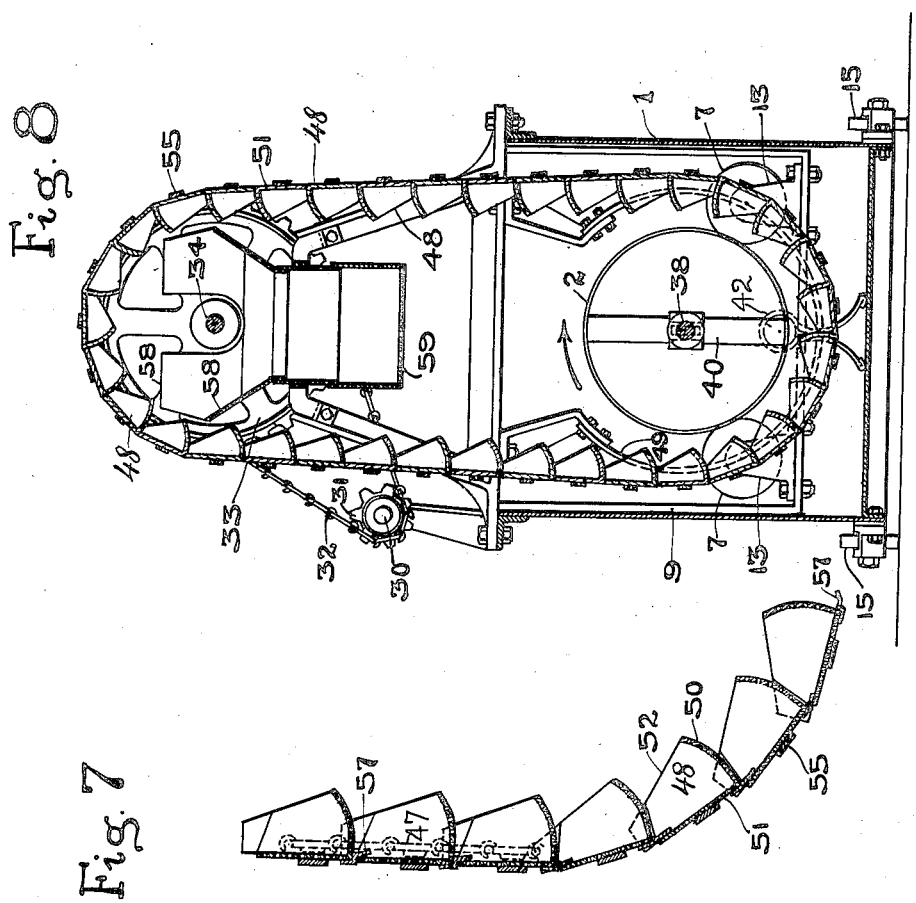

UNITED STATES PATENT OFFICE.

ADOLPH W. MACHLET, OF ELIZABETH, NEW JERSEY.

HARDENING APPARATUS.

No. 890,148.  Specification of Letters Patent.  Patented June 9, 1908.

Application filed April 3, 1907. Serial No. 366,121.

*To all whom it may concern:*

Be it known that I, ADOLPH W. MACHLET, a citizen of the United States, residing in Elizabeth, in the county of Union and State of New Jersey, have invented certain new and useful Improvements in Hardening Apparatus, of which the following is a specification.

This invention relates to means for cooling incandescent steel and other metal articles to give them hardness or temper or for other purposes.

In hardening small articles in bulk, it is customary to deposit the incandescent articles in a basket or such receptacle, and dip the same into cooling liquid, and to raise the basket out of the liquid after the articles have cooled. This method has been unsatisfactory. The articles in the middle of the mass come into contact only with liquid that has been highly heated by a contact with the surrounding articles. There is lack of uniformity of hardening among different articles in the same mass, and again some of the articles are hardened unevenly, due to the exposure of one side to cold liquid, while the other side is exposed only to hot liquid.

The object of this invention is to secure accurate, thorough and uniform hardening of articles in bulk. To this end, a foraminous or open barrel is mounted in a tank containing the hardening liquid, and the hot articles are fed through a hopper into one end of said barrel, which is caused to revolve slowly to agitate the articles, while they are being subjected to the action of the liquid which is thoroughly circulated among them. Preferably cold liquid is admitted beneath the barrel, and the heated liquid is drained off from the upper portion of the tank, so that thorough exposure of the articles to a sufficiently cold liquid is assured. The barrel lies prone in the tank and inclines slightly from its receiving end to its discharge end, so that as the barrel revolves slowly the articles travel gradually from the receiving to the discharge end thereof. The articles are received from the barrel in a series of buckets connected together to form an endless chain, whereby they are elevated from the tank, the buckets being preferably foraminous, so as to strain the water from the articles. The chain and the barrel are suitably connected to a common source of power. The chain is suspended from a pair of wheels, which are supported over the tank, and suitable stationary guides are provided in the tank, to guide the lower loop of the chain. The buckets open on the inner side of the chain, and the barrel discharges directly within the lower loop thereof. Within the upper loop of the chain is fixed a hopper into which the buckets dump the articles, and from said hopper a discharge chute leads away from the tank.

Other features and advantages will hereinafter appear.

Figure 2:
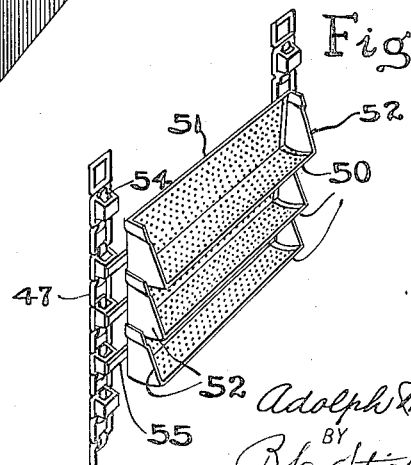

In the accompanying drawings, Figure 1 is a perspective view of one form of the invention. Fig. 2 is a perspective view of a fragment of the elevating chain. Fig. 3 is a longitudinal sectional elevation of the apparatus. Fig. 4 is a plan of the apparatus illustrating the tank as having been rolled beneath the discharge chute of a heater, the latter shown in dotted lines at Fig. 3. Fig. 5 is a detail side view, and Fig. 6 a face view of a straining bucket and its connections. Fig. 7 is a sectional elevation of a portion of the elevating chain. Fig. 8 is a sectional elevation taken through the apparatus about centrally of the elevating chain.

In a tank 1 is mounted a prone barrel 2 preferably consisting of open mesh wire netting, as seen at 3, and having treads 4, 5 in the form of hoops surrounding the barrel near its ends and running upon trundles 6, 7, within the tank, the trundles being carried by hangers 8, 9, each in the form of a metal strip bent into U-shape to fit between the opposite walls of the tank and having ears 10, 11 overhanging the rim of the tank. The trundle 6 is set higher than the trundle 7, so as to give the barrel a slight inclination downward from its receiving end to its discharge end; the height of the receiving end of the barrel being regulatable by means of screws 12 threaded through the ears 10 and resting upon the tank rim. The trundles are mounted in brackets 13 suitably secured upon the hangers.

The heated articles are dumped into a hopper 14 at one end of the tank, and lying about level with the rim of the tank, so that the apparatus which is provided with trucks 15 may be rolled beneath the discharge end of any suitable heating apparatus 16; the latter usually having a power-driven set of gearing 17, to revolve a heating drum 18 from which the articles are automatically discharged in a well known manner, as soon as they are heated; a chute 19 being sometimes provided to guide the articles from the heater into the hopper 14 of the cooling apparatus.

The neck 20 of the hopper 14 is adjustable up and down in a sleeve 21 provided upon the upper end of a diagonal chute 22 whose mouth 23 is inserted within a ring 24 forming the open head of the barrel 2. The sleeve 21 may move up and down the neck 20, to accommodate the up and down adjustment of the receiving end of the barrel effected by means of the screws 12. An ear 25 may be fixed to the hopper, and a screw 26 passing through a vertical slot 27 in said ear may be used to secure the chute adjustably to the ear, of which a pair may be provided one upon each side of the hopper.

The barrel is revolved by means of a belt 28 connected to any suitable source of power and running over a sprocket 29 fixed upon a shaft 30 upon which is also fixed a pinion 31 connected by a chain 32 to a large sprocket 33; the latter fixed upon the same shaft 34 as a sprocket 35, which is connected by a chain 36 to a small sprocket or pinion 37 fixed upon a shaft 38 having a universal connection 39 with a bar 40 extending across and secured to the open discharge end of the barrel. The shaft 30 may operate a worm 41 to drive the gear 17 which feeds the articles forwardly and causes them to discharge from the heater 16, whereby the speed of rotation of the cooling barrel 2 may be suitably proportioned to the rate at which the articles are discharged from the heater 16.

It will be understood that owing to the continuous rotation of the barrel, the articles are constantly agitated while being chilled, so that all portions of each article are fully exposed to the cooling effect of the liquid; and during such agitation they are advanced through the liquid to the discharge end of the barrel, the liquid being kept in constant circulation by reason of the rotation of the barrel, so that accurate, thorough and uniform hardening of the articles is assured. Fresh cool liquid may be supplied through a spray 42, which is preferably directly under the receiving portion of the barrel, whereby jets of cool liquid are sent up to the barrel to cool, to effect rapid chilling of the heated articles; the spray 42 consisting of a pipe having outlets 43 only in its upper side. The hot liquid is drawn off by means of a trough 43ª having a closed end 44 and located at the upper end of the tank and preferably close to the barrel 2 and adapted to draw off the hottest part of the liquid; the trough being of sufficient area to enable all of the surplus liquid to pass over the edges of the trough in the form of a thin sheet or sheets, thus in effect skimming the hottest part from the surface of the liquid in the tank. The trough opens into a suitable outlet pipe 45 discharging at 46.

It will be seen that the barrel is bodily confined within the tank, and that the water may rise nearly to the top of the tank, thereby effecting practically the entire immersion of the barrel, so that an abundance of water is constantly contained within the barrel in which to tumble the articles, to secure even exposure thereof to the liquid.

The tank needs to be only a little larger than the barrel, as illustrated, since the substantially entire immersion of the barrel utilizes to the full the water contained within the tank; thus conducing to compactness and low cost of the apparatus.

The cold articles are duly discharged from the barrel and raised out of the tank by means of an elevating chain operated by the power-driven shaft 34. A pair of sprocket wheels 46 fixed upon said shaft carry link belts 47 between which extend a series of buckets 48, which are supported by the belts and form a chain, the lower loop of which hangs in the tank and receives the discharge end of the barrel 2; the articles being discharged from the latter directly into the buckets 48 which open on the inner side of the loop. U-shaped guides 49 are fixed in the tank to guide the belts 47, the latter running upon and directly around the guides. Each bucket comprises a bottom 50, a back 51 and sides 52, the parts 50 and 51 being perforated as shown, so as to strain off the liquid from the articles as they elevate from the tank. In each of the belts, alternate links 53 are formed with elevations 54 upon which are secured cross bars 55 by means of screws 56; said bars extending across from one belt to the other, and each bar carrying one of the buckets; the bar being fixed directly upon the back of the bucket in any suitable manner. The belt links are detachable each from the next, thus rendering it convenient to assemble the buckets to form an endless chain. From the bottom of each bucket depends an apron or guard 57 to cover the joint between the buckets and prevent escape of small articles; while for the same purpose, the bottom portion of each bucket lies between the sides of the next bucket, as seen at Fig. 7, the buckets therefore having an overlapping relation.

Between the sprocket wheels 46 is fixed a hopper 58 into which the buckets 48 dump the cooled and strained articles, the latter dropping into a chute 59 which leads into an inclined discharge chute 60 passing out beneath one of the wheels 46 and terminating outside of the tank.

Variations may be resorted to within the scope of the invention, and portions of the improvements may be used without others.

Having thus described my invention, I claim:

1. A hardening apparatus comprising a tank, a foraminous barrel in said tank, means for revolving said barrel, a hopper discharging into said barrel, said barrel having provision for causing the articles received from said hopper to travel to the other end of the barrel, an elevating chain having a series of liquid straining buckets into which said barrel discharges, means for causing said chain to ascend from the tank, a hopper into which said buckets discharge, and a discharge conduit leading from the last-mentioned hopper.

2. A hardening apparatus comprising a tank, a foraminous barrel in said tank, means for causing articles delivered into one end of the barrel, to travel to the other end thereof and discharge therefrom, and means for raising the discharged articles from the tank.

3. A hardening apparatus comprising a tank, a foraminous barrel mounted for revolution in said tank, and having its floor inclined from its receiving end to its discharge end, and means for receiving and raising the discharged articles from the tank.

4. A hardening apparatus comprising a tank, a prone barrel in said tank mounted to revolve upon an inclined axis, means for discharging articles into said barrel at its upper end, and means at the lower end of the barrel to receive the articles and remove them from the tank; said barrel being open to permit free circulation of liquid therethrough.

5. A hardening apparatus comprising a tank, a foraminous barrel in said tank, means for discharging articles into one end of said barrel, means for causing the articles to travel to the other end of said barrel, and means for removing the articles from the tank.

6. A hardening apparatus comprising a tank, a foraminous barrel therein, provided with treads, trundles in said tank upon which said treads run, and means for revolving the barrel and discharging the hardened articles from the tank; said barrel having open ends, one to receive the articles and the other to deliver them to said discharging means.

7. A hardening apparatus comprising a tank, a foraminous barrel therein, provided with treads, trundles in said tank upon which said treads run, hangers in said tank to support said trundles, each hanger extending across the tank and supported upon opposite sides thereof, and carrying a plurality of trundles, and means for revolving the barrel.

8. A hardening apparatus comprising a tank, a prone foraminous barrel therein, having treads, trundles in said tank upon which said treads run, said trundles supporting said barrel at a slight inclination downwardly from its receiving end to its discharging end, a conduit for discharging articles into the receiving end of said barrel, and means connected to the discharging end of said barrel for revolving the same.

9. A hardening apparatus comprising a tank, an elevator whose lower end extends into said tank, power-driven means for operating said elevator, and means connected to said power-driven means, to agitate articles deposited in the tank and then deposit them upon said elevator.

10. A hardening apparatus comprising a tank, an elevator whose lower end extends into said tank, said elevator having a series of foraminous receptacles for the hardened articles, a driver for said elevator, and means connected to said driver to agitate articles deposited in the tank and then deposit them upon said elevator.

11. A hardening apparatus comprising a tank, a chain of elevating buckets dipping into said tank, a driver connected to said chain, an open barrel in said tank and depositing the articles into said buckets, and means connected to said driver to revolve said barrel.

12. A hardening apparatus comprising a tank, an open barrel within the tank to receive the articles at one end, means to cause the articles to travel to the discharge end of the barrel, an endless chain of elevating buckets having its lower loop hanging within said tank, the discharge end of said barrel being inserted within said loop, and means to drive the chain.

13. A hardening apparatus comprising a tank, an open barrel within the tank to receive the articles at one end and discharge them at the other end, means to revolve the barrel, a series of elevating buckets connected to form an endless chain, the buckets opening on the inner side of the chain, and a loop of said chain hanging within said tank, means within the tank to guide said loop, and means to drive the chain; the discharge end of said barrel being inserted within said loop.

14. A hardening apparatus comprising a tank, an open barrel within the tank to receive the articles and discharge them at one of its ends, means to revolve the barrel, a series of elevating buckets, a pair of belts between which said buckets extend, and to which the buckets are connected, to form an endless elevating chain of which a loop hangs within the tank, said buckets opening on the inner side of the elevating chain, guiding means within the tank engaged by said belts, the discharge end of said barrel being inserted within said loop, and means to drive the buckets.

15. A hardening apparatus comprising a tank, an open barrel within the tank to receive the articles and discharge them at one of its ends, means to revolve the barrel, a series of elevating buckets, a pair of belts between which said buckets extend, and to which the buckets are connected, to form an endless elevating chain of which a loop hangs within the tank, said buckets opening on the inner side of the elevating chain, guiding means within the tank engaged by said belts, the discharge end of said barrel being inserted within said loop, a pair of wheels above said tank and over which the belts run, and a discharge spout whose receiving end is located between said wheels.

16. A hardening apparatus comprising a tank, an open barrel within the tank to receive the articles and discharge them at one of its ends, means to revolve the barrel, a series of elevating buckets, a pair of belts between which said buckets extend, and to which the buckets are connected, to form an endless elevating chain of which a loop hangs within the tank, said buckets opening on the inner side of the elevating chain, guiding means within the tank engaged by said belts, the discharge end of said barrel being inserted within said loop, a pair of wheels above said tank and over which the belts run, and a discharge spout whose receiving end is located between said wheels, said spout extending below one of said wheels and inclining downwardly and extending outwardly from the bucket chain, and terminating in position to discharge beyond the end of the tank.

17. A hardening apparatus comprising a tank, an open barrel within the tank to receive the articles and discharge them at one of its ends, a series of elevating buckets, a pair of belts between which said buckets extend, and to which the buckets are connected, to form an endless elevating chain of which a loop hangs within the tank, said buckets opening on the inner side of the elevating chain, guiding means within the tank engaged by said belts, the discharge end of said barrel being inserted within said loop, a pair of wheels over which the upper portions of said belts run, a shaft upon which said wheels are mounted, a sprocket wheel upon said shaft, and a chain running from said sprocket wheel over a sprocket wheel mounted within the tank and connected by a shaft to the discharge end of said barrel.

18. A hardening apparatus comprising a tank, an elevating chain having a loop within the tank and comprising a series of buckets and means at the ends of the buckets to connect them together, each bucket comprising a bottom, a back and sides, the buckets being mounted in overlapping relation and opening within said loop, and a revoluble foraminous barrel within the tank to receive the articles and tumble them in the liquid and discharge them into said loop.

19. A hardening apparatus comprising a tank, an elevating chain having a loop within the tank and comprising a series of buckets and means at the ends of the buckets to connect them together, each bucket comprising a bottom, a back and sides, the buckets opening within said loop, and the bottom of each bucket being confined between the sides of the succeeding bucket, and an apron or guard extending from the bottom of each bucket to cover the joint between the same and the top of the next buckets, and a revoluble foraminous barrel within the tank to receive the articles and tumble them in the liquid and discharge them into said loop.

20. A hardening apparatus comprising a tank, a pair of link-belts, a pair of wheels over which said belts run, buckets extending between said belts, cross-bars connecting certain of the links in one belt with corresponding links in the other belt and supporting said buckets, to form an elevator chain having a loop within said tank, and a revoluble foraminous barrel within the tank to receive the articles and tumble them in the liquid and discharge them into said loop.

21. A hardening apparatus comprising a tank, a foraminous barrel in said tank, means for causing articles delivered into one end of the barrel, to travel to the other end thereof and discharge therefrom, means for raising the discharged articles from the tank, a spray in said tank at the lower portion of said barrel to supply cold liquid, and an outlet for the hot liquid at the upper part of the tank.

22. A hardening apparatus comprising a tank, a foraminous barrel in said tank, means for causing articles delivered into one end of the barrel, to travel to the other end thereof and discharge therefrom, means for raising the discharged articles from the tank, a spray in said tank at the lower portion of said barrel to supply cold liquid, an outlet for the hot liquid at the upper part of the tank, said outlet comprising a trough at the upper part of the tank, and a discharge pipe leading from said box out of the tank.

23. A hardening apparatus comprising a tank, a foraminous barrel within the tank, means being provided to facilitate introduction of heated articles into one end of the barrel, and the other end of the barrel being open, a bar crossing the open end of the barrel and fixed thereto, a driving shaft connected to said bar, provision being made for causing the articles to travel gradually to the discharge end of the barrel, and means to receive the articles from the barrel and elevate them from the tank.

24. A hardening apparatus comprising a tank, a foraminous barrel mounted for revolution in said tank, and having its floor inclined from its receiving end to its discharge end, means to regulate the height of the receiving end of the barrel, means for receiving and raising the discharged articles from the tank.

25. A hardening apparatus comprising a tank, a foraminous prone barrel in said tank and inclining downwardly from its receiving end to its discharge end, means to regulate the height of the receiving end of the barrel, a chute leading into the receiving end of the barrel, a hopper supported upon the tank and leading into said chute, means being provided for effecting relative-adjustment between the chute and the hopper, means for revolving the barrel, and means to receive the articles from the barrel and raise them from the tank.

26. A hardening apparatus comprising a tank, means within the tank to agitate the articles to cause them to progress through the liquid, means to supply cold liquid, a trough in the upper part of the tank connected to an outlet, said trough being of sufficient area to enable all of the surplus liquid to pass over the edges of the trough thereinto in the form of a thin sheet or sheets to skim the hottest part from the surface of the liquid in the tank, and means to deliver the articles from the tank.

27. A hardening apparatus comprising a tank, a foraminous barrel bodily confined within the tank, means for turning the barrel, means being provided for causing the articles to travel through the barrel and discharge therefrom, and means extending within the tank to raise the discharged articles from the liquid therein and deliver them outside of the tank.

28. A hardening apparatus comprising a heating machine, a tank, a foraminous barrel bodily confined within the tank, the tank having an overflow, and the discharge end of the barrel being below the overflow, and the barrel having its floor inclined from its receiving end to its discharge end, means connected to the heating machine to rotate said barrel, and means extending to the bottom of the tank for receiving and raising the discharged articles and delivering them outside of the tank.

29. In a hardening apparatus comprising a heating machine, a tank, means within the tank and connected to the heating machine for tumbling the articles during exposure to the liquid in the tank, and means extending within the tank for raising the hardened articles from the liquid and discharging them outside of the tank.

30. A hardening apparatus comprising a heating machine, a tank, a barrel within the tank, means connected to the heating machine to turn the barrel and tumble the articles, and cause them to progress through the barrel; said barrel bodily confined within the tank; and means to receive the articles from the barrel and raise them from the liquid and discharge them outside of the tank.

31. A hardening apparatus comprising a tank, a barrel in the tank, means to revolve the barrel, means to supply cool liquid to the bottom of the tank, and means to raise the articles from the liquid and deliver them outside of the tank.

ADOLPH W. MACHLET.

Witnesses:
SAMUEL R. OGDEN,
FRITZ W. MACHLET.